United States Patent [19]

Jarvis

[11] Patent Number: 5,086,705
[45] Date of Patent: Feb. 11, 1992

[54] LINEAR POSITIONING SYSTEM

[76] Inventors: Bernard Jarvis, 209 W. 23rd St., Hutchinson, Kans. 67501; Edward L. Dobkins, 2500 E. 40th, Hutchinson, Kans. 67502

[21] Appl. No.: 485,090

[22] Filed: Feb. 26, 1990

[51] Int. Cl.⁵ .............................................. B61B 13/04
[52] U.S. Cl. ................................... 105/30; 105/29.1; 105/141; 105/157.1; 105/167
[58] Field of Search .................... 105/26.05, 29.1, 29.2, 105/30, 141, 157.1, 165, 167, 168; 104/119, 118, 245, 246; 228/29; 173/31, 32, 33, 34, 37; 33/21.1, 21.3

[56] References Cited
U.S. PATENT DOCUMENTS

| | | | |
|---|---|---|---|
| 1,412,383 | 4/1922 | Barrow | 105/165 |
| 3,485,306 | 12/1969 | Gulley | 33/21.3 |
| 4,158,315 | 6/1979 | Kensrue et al. | 173/32 |
| 4,422,384 | 12/1983 | Johnson et al. | 105/29.1 |
| 4,570,542 | 2/1986 | Cable et al. | 105/29.1 |

FOREIGN PATENT DOCUMENTS 3801057 7/1989 Fed. Rep. of Germany ...... 104/119

Primary Examiner—Robert J. Oberleitner
Assistant Examiner—Mark T. Le
Attorney, Agent, or Firm—Edward L. Brown, Jr.

[57] ABSTRACT

The present invention is a positioning system providing precise linear and arcuate movements of the carriage along either straight or curved sections of rail comprising a pair of pivoting bogies attached to the carriage which have a pair of oppositely-directed ball bearing assemblies rigidly mounted to journal shafts on the bogies for retention and contact of the roller bearings with opposing sides of the rail running surfaces in a preloaded condition on the rail.

8 Claims, 2 Drawing Sheets

LINEAR POSITIONING SYSTEM

BACKGROUND OF THE INVENTION

The present invention relates to linear positioning and more specifically to a system which provides both linear and arcuate positioning on a common rail with a very accurate degree of dimensional location. In the early days of linear positioning, carriage and track combinations were utilized for cutting, welding and other machine tool functions but with a minimal degree of positioning accuracy. Typical systems of this nature are illustrated in the following patents: Johnson, et al, U.S. Pat. No. 4,422,384; Appleton, et al, U.S. Pat. No. 3,176,587; Cable, et al, U.S. Pat. No. 3,226,027; Gulley, U.S. Pat. No. Re. 28,121; Livesay U.S. Pat. No. 2,474,153.

The degree of accuracy of the positioning equipment in the patents mentioned above was far less than some design standards of today technology such as required in the field of computer chip integrated circuit design.

Most of the patents above-listed, such as Johnson, et al (U.S. Pat. No. 4,422,384) are concerned with strictly linear movement or strictly non-linear (arcuate) movement with the exception of the patent to Appleton, et al (U.S. Pat. No. 3,176,587). The lastmentioned patent deals with both linear and curved positioning as in the present invention, however, the manner in which it is achieved and the degree of accuracy attained is much different. As shown in FIG. 9 of Appleton, the curved movement is achieved by movement of the spring-biased and tilting trucks 156 and 157. In this less accurate design the distance between the opposing rollers varies in the curved sections while in the present invention, the distance is constant and the curved section is accommodated by selfrotation of the bogie.

The requirements of linear positioning today have substantially changed in the field of microchip integrated circuit design. A critical ingredient is the ability to inscribe even more minute features on a chip. Reductions in circuit size allowing dramatic increases in chip density have taken place in the last few decades and still continue. Today integrated circuit design has run into an obstacle known and referred to as the one micron barrier. One micron is the size of the smallest geometric features on a modern semi-conductor microchips. It is quite difficult to construct chips with feature dimensions below this level. Accurate positioning systems are an essential part of the semi-conductor wafer fabrication, inspection and testing procedures.

In the market today there are a variety of linear positioning systems that provide either strictly linear positioning or strictly non-linear positioning, however, none of them provide guidance in both linear and curved modes while maintaining the accuracy level requirements of current industry. The requirements for linear positioning vary with the engineering application having various accuracy in movement requirements as to horizontal linearity (yaw); vertical linearity (pitch) and lastly roll.

In linear motion applications there is a requirement to restrain the motion of a body in two perpendicular axes while allowing movement in the third. Bearing systems on the market today used for linear positioning involve either a sliding bearing or some type of a rolling bearing.

SUMMARY OF THE INVENTION

The positioning system of the present invention incorporates both linear positioning and circular or arcuate positioning both in the same system while maintaining a constant preload of the rollers on the rail at all times. The carriage of the present invention incorporates two separate bogies which are rotatably journaled to the carriage with each bogie carrying a pair of roller bearing assemblies arranged on opposite sides of a constant width vee-shaped rail therebetween. The rollers on one side of the rail are carried on eccentric journals. By rotating the eccentric journal, the rollers are loaded against the rail to produce a preloaded condition whereby the positioning system has essentially no play. While the prior art systems currently on the market provide numerous types of either strictly linear guidance systems or circular guidance systems but none which provide both. As the carriage of the present invention progresses along a guiding rail and comes to a curved section, each bogie is free to rotate thereby compensating for the varying geometry of the curved section while maintaining the preloaded condition at all times.

It is therefore a principal object of the present invention to provide a combined linear and circular positioning system also referred to as a circulinear positioning system.

Another object of the present invention is to provide a roller-type positioning system wherein there is a constant preloading on the rail.

A further object of the present invention is to provide a roller-type positioning system wherein the preload is easily adjusted and the degree of positioning accurancy is high.

Other objects and advantages of this invention will be apparent from the following description and the accompanying drawings in which:

DESCRIPTION OF THE PREFERRED EMBODIMENT

Figure 1:
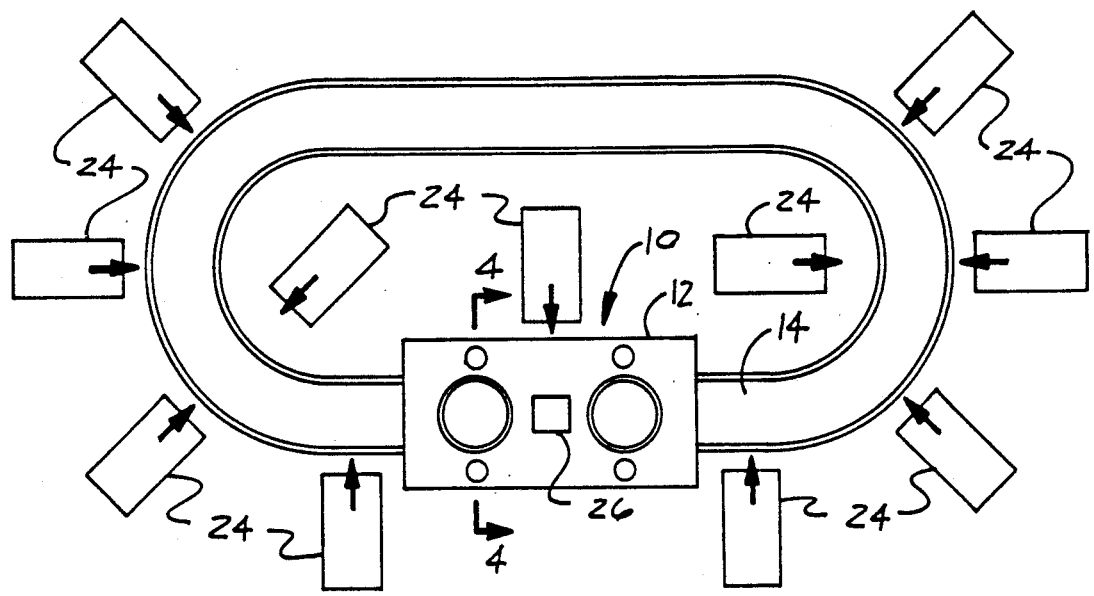
FIG. 1 is a partially schematic plan view of the circulinear positioning system of the present invention with a plurality of assembly stations.
Figure 4:
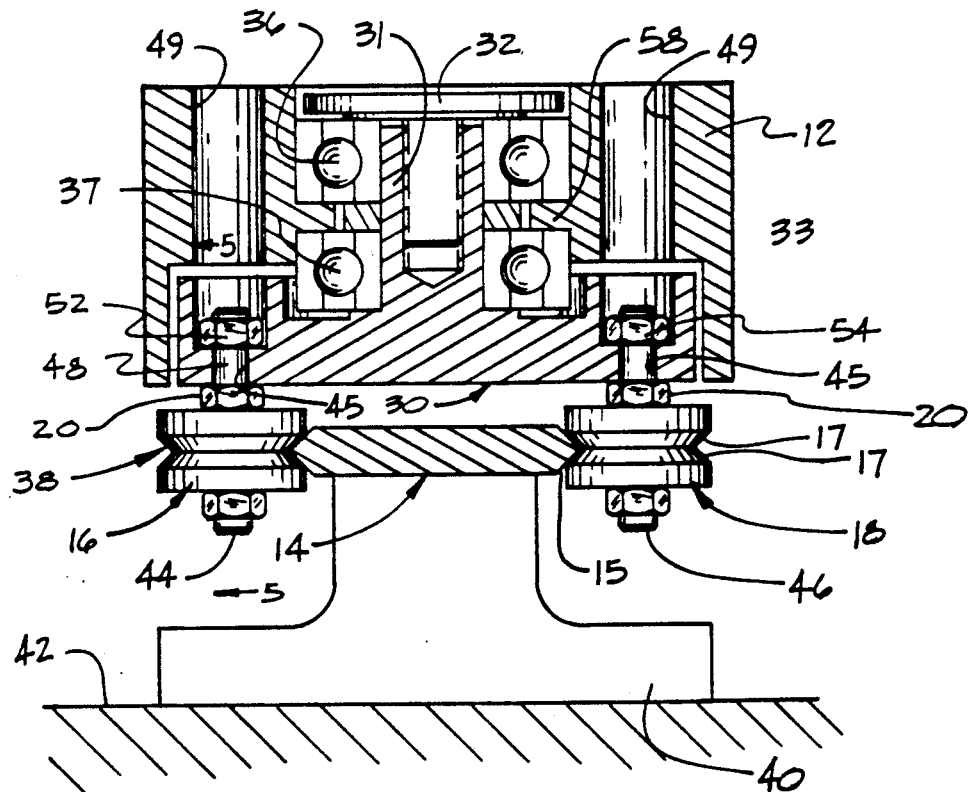
FIG. 4 is a vertical sectional view of the carriage taken along lines 4—4 of FIG. 1.
Figure 2:
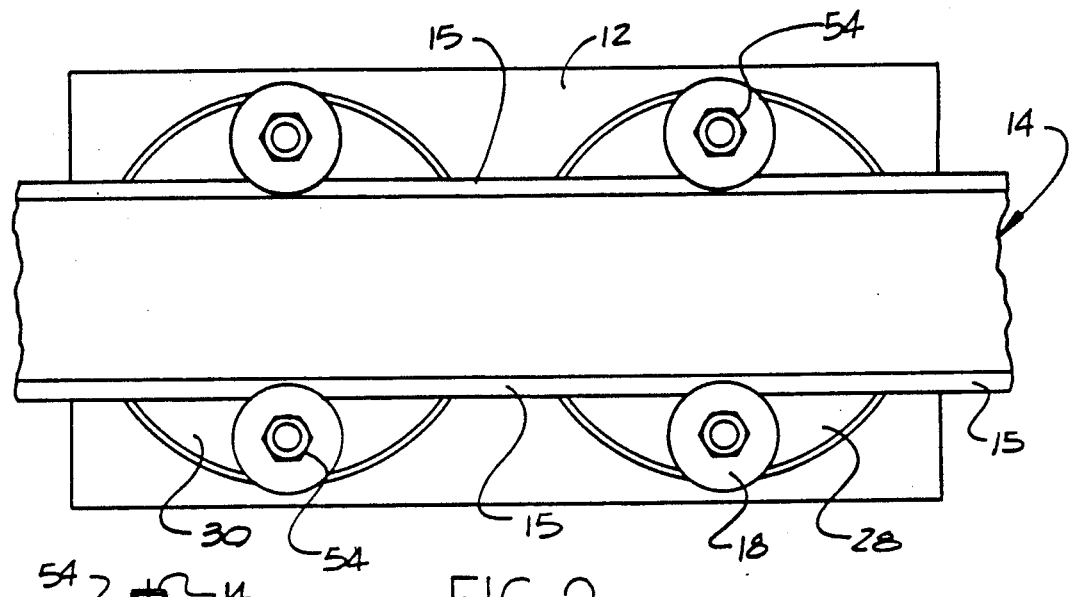
FIG. 2 is a bottom plan view of the carriage and a portion of the rail.

The positioning system 10 is a combined linear and circular movement system also referred to as a circulinear positioning system, as best seen in FIG. 1. The system includes a carriage 12 carried on a track 14 which includes both curved and linear sections. Track 14 could have a variety of other shapes including numerous additional curve sections in different directions as well as linear sections. Rotatably journaled to carriage 12 are a pair of identical bogies 28 and 30, as best seen in FIGS. 2 and 4. The circular-shaped bogies are positioned in like-shaped cavities under the carriage, as seen in FIG. 4, with a spindle portion 31 extending up through a central opening in the carriage, in engagement with a pair of roller bearings 36 and 37. Spindle 31 includes a threaded bore in the open end thereof for receipt of a bearing retainer 32 which engages ball bearing 36. Positioned between bearings 36 and 37 is a web member 58 in the carriage which when bearings 36 and 37 are in place retains the bogie 30 from any axial movement in carriage 12. The outer races of bearings 36 and 37 are snugly received in their respective openings in carriage 12 juxtaposed to web 58. When bearing retainer 32 is threaded into spindle 31, all axial tolerance and movement of bogie 30 in carriage 12 is removed.

Figure 5:
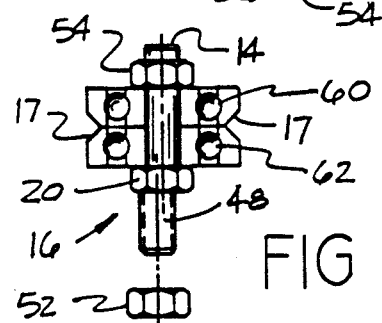
FIG. 5 is a partially sectional view of a roller bearing assembly.
Figure 3:
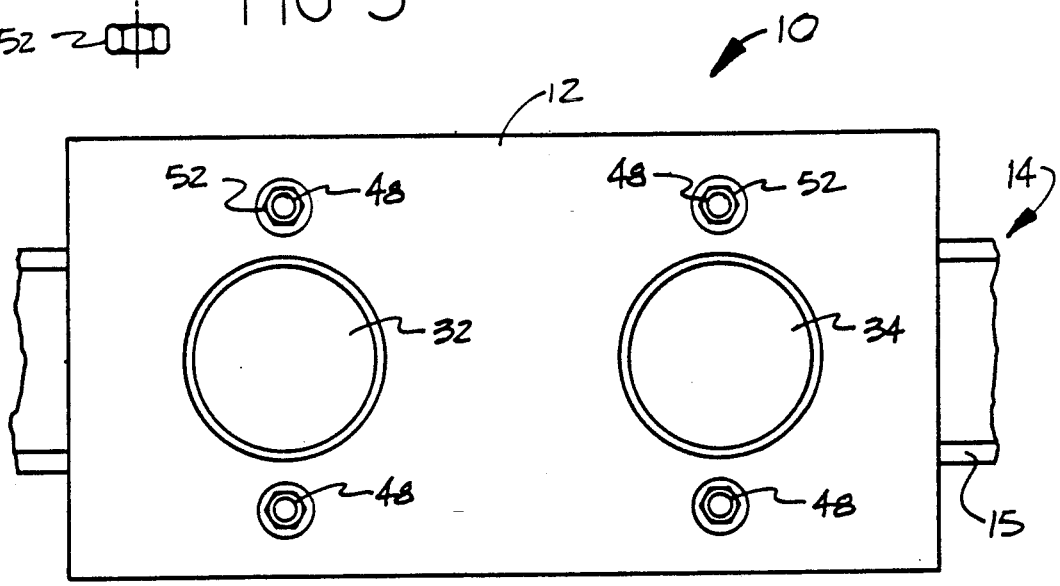
FIG. 3 is top plan view of the carriage.

Each bogie 28 and 30 includes a pair of roller bearing assemblies 16 and 18 which in turn engage the rail 14, as best seen in FIG. 4. Roller bearing assembly 16, as shown in section in FIG. 5, includes a shaft 44 on which a pair of radial ball bearings 60 and 62 are mounted. The outer circumferential edge of each ball bearing 60 and 62 is cut with a 45° bevel 17 whereby the pair of bearings 60 and 62 provide a vee-shaped groove for engagement with the corresponding vee-shaped running surfaces 15 on the rail. The bearing mounted shaft 14, as seen in FIG. 5, includes an eccentric journal 48. By loosening nut 52 and rotating journal 48, the roller bearing assembly 16 is preloaded against rail 14 to prevent any slack of the carriage 12 on the rail 14. Bores 49 in carriage 12 permit tool access to the roller bearing assemblies for removal or ajustment of the preload. Roller bearing assembly 18 has no eccentric journal and is made up of a mounting shaft 46 which retains the two ball bearings in tightly spaced relation between nuts 48 and 20 while nut 54 attaches the roller bearing assembly 18 to bogie 30. Shaft 46 is snugly received in bore 45 as is eccentric journal 48 in a similar diameter bore 45 on the opposite side of the bogie.

OPERATION

The actuation methods for moving a carriage 12 are well-known and not shown in the drawings. Typical actuators could be motorized screws of various types, air or hydrualic cylinders, timing belts or linear motors, all of which are well-known in the prior art.

If, for example, the positioning system is used to assemble electronic circuit boards, a variety of assembly stations 24 can be placed around track 14, as symbolically shown in FIG. 1. While only a single carriage 12 is illustrated, numerous carriages could be mounted on track 14. Each carriage 12 would support a holding fixture 26 for an individual circuit board which would move from station-to-station wherein additional parts are assembled at each station. Each board needs to locate in a precise location and orientation at each station so that the added components or operations performed are installed in the correct location. Because the carriages 12 are under constant preload, straightness of travel can be 0.0005 inches per foot traveled in the system of the present invention. Because the carriages as they move remain rigid, there is no variation from location to location and no requirement for clamping and unclamping the circuit boards is necessary. In addition, the individual component installation stations 24 can be located in a more compact layout with a circulinear system, taking advantage of the fact that the carriages remain rigid at all times as they travel along infinitely variable track configurations.

Various changes may be made in the details of the illustrated embodiments without departing from the inventive concept disclosed. Accordingly, it is intended that what is described herein should be regarded as illustrative of such concept and not for the purpose of limiting protection to the particular embodiment thereof.

What is claimed is:

1. A carriage and rail positioning system providing precise linear and arcuate movement of a workpiece comprising:

a longitudinally extending fixed rail of uniform width and thickness including linear and arcuate sections, the rail having two opposed running surfaces on the sides thereof;

a carriage means for transporting a workpiece along said rail including a base;

a pair of bogies each connected to the base by a rotatable journal positioned on an axis parallel to the other bogie axis of rotation;

a pair of ball bearing assemblies rigidly mounted on each bogie on axes parallel to the bogie axes of rotation and spaced apart a fixed distance for retention and contact of the ball bearing assemblies with said opposing rail running surfaces; and a mounting shaft rotatably journaling each ball bearing assembly to its respective bogie, including an eccentric journal for lateral shifting of the ball bearing assembly to preload the ball bearing assembly on the rail.

2. A carriage and rail positioning system as set forth in claim 1, wherein each bogie includes a concentric spindle which extends upwardly in the carriage and the carriage includes a second pair of ball bearings concentrically seated therein which rotatably receive and mount said spindle.

3. A carriage and rail positioning system as set forth in claim 1, wherein the rail running surfaces are vee-shaped and the ball bearing assemblies include a corresponding vee-shaped circumferential groove for receipt of the rail.

4. A carriage and rail positioning system as set forth in claim 1, wherein the rail running surfaces are a pair of bevels 90° to each other and the ball bearing assemblies include a corresponding 90° vee-shaped circumferential groove for receipt of the rail.

5. A carriage and ball positioning system as set forth in claim 1 wherein the rotatable journal is centered on each bogie and is a part thereof, the rotatable journal extends into the base for engagement with two bearings, one positioned over the other, and each of which is seated in the base.

6. A carriage and rail positioning system as set forth in claim 1, wherein each ball bearing assembly comprises two ball bearings each having an inner and outer race with the outer race of each bearing beveled on one side to form a vee-shaped notch between the two ball bearings.

7. A carriage and rail positioning system as set forth in claim 1, wherein the axes of rotation of both bogies and the ball bearing assemblies are parallel and vertically positioned in use.

8. A carriage and rail positioning system as set forth in claim 1, wherein the rail width is at least three times the rail's thickness and the running surfaces are vee-shaped and the ball bearing assemblies include a corresponding vee-shaped circumferential groove for receipt of the rail.

* * * * *